United States Patent
Celiesius

(10) Patent No.: US 11,363,062 B1
(45) Date of Patent: Jun. 14, 2022

(54) SYSTEM AND METHOD FOR DECENTRALIZED INTERNET TRAFFIC FILTERING POLICY REPORTING

(71) Applicant: Peakstar Technologies Inc., Lewes, DE (US)

(72) Inventor: Kazimieras Celiesius, Vilnius (LT)

(73) Assignee: Peakstar Technologies Inc., Lewes, DE (US)

(*) Notice: Subject to any disclaimer, the term of this patent is extended or adjusted under 35 U.S.C. 154(b) by 0 days.

(21) Appl. No.: 17/219,789

(22) Filed: Mar. 31, 2021

(51) Int. Cl.
H04L 61/4511 (2022.01)
H04L 9/40 (2022.01)

(52) U.S. Cl.
CPC ...... *H04L 63/1475* (2013.01); *H04L 61/1511* (2013.01); *H04L 63/0272* (2013.01); *H04L 63/0414* (2013.01); *H04L 63/0263* (2013.01)

(58) Field of Classification Search
CPC ............. H04L 63/0263; H04L 63/0272; H04L 63/0414; H04L 63/1475; H04L 61/1511
See application file for complete search history.

(56) References Cited

U.S. PATENT DOCUMENTS

| | | | |
|---|---|---|---|
| 7,032,022 B1* | 4/2006 | Shanumgam | H04L 41/0893 707/999.009 |
| 8,291,483 B2* | 10/2012 | Kreil | H04L 63/20 726/11 |
| 8,832,833 B2* | 9/2014 | Demopoulos | H04L 63/0209 726/23 |
| 10,972,436 B1* | 4/2021 | Simanel | H04L 63/0272 |
| 2005/0235360 A1* | 10/2005 | Pearson | H04L 63/1408 726/23 |
| 2012/0303808 A1* | 11/2012 | Xie | H04L 63/101 709/225 |
| 2018/0097774 A1* | 4/2018 | Ore | H04L 9/08 |
| 2018/0300475 A1* | 10/2018 | Zhang | H04L 63/0236 |
| 2019/0215230 A1* | 7/2019 | Mermoud | H04L 41/064 |
| 2020/0311630 A1* | 10/2020 | Risoldi | G06F 21/577 |

* cited by examiner

*Primary Examiner* — Linglan E Edwards
(74) *Attorney, Agent, or Firm* — Young Basile Hanlon & MacFarlane, P.C.

(57) ABSTRACT

A system and method to filter potentially unwanted traffic from trackers, third-party cookies, malicious websites or other sources and present the aggregated results of said filtering to the VPN user. One of the embodiments enables a VPN user to opt-in or opt-out from the filtering activities while being able to access the aggregated information about filtering. In another embodiment, the user can choose to customize the filtering parameters to add or remove specific targets from the filtering policies.

12 Claims, 12 Drawing Sheets

SYSTEM AND METHOD FOR DECENTRALIZED INTERNET TRAFFIC FILTERING POLICY REPORTING

FIELD

The disclosure belongs to the area of virtual private network (VPN) and traffic filtering technology. More specifically, the disclosures present an efficient way to block potentially unwanted traffic and present the aggregated blocking results to a VPN user.

BACKGROUND

VPN stands for Virtual Private Network (VPN), a technology that allows a network entity to connect to a private network over a public network. Traditionally the main function of VPN has been to allow for a roaming client, or a distant office connected to a public network, to connect to a private network for accessing the resources within e.g. business applications within a corporate LAN.

VPN technology was developed to allow remote users and branch offices to access corporate applications and resources. To ensure security, the private network connection is established using an encrypted layered tunneling protocol and VPN users use authentication methods, including passwords or certificates, to gain access to the VPN. In other applications, Internet users may secure their connections with a VPN, to circumvent geo-restrictions and censorship, or to connect to proxy servers to protect personal identity and location to stay anonymous on the Internet.

VPN customers generally use TCP for connection to resources on the Internet while connected to the VPN service provider. As a standard during the connection, a single end-to-end TCP link is established over the VPN tunnel from the VPN customer to the target resource on the Internet. The endpoints of this TCP connection negotiate, or inform each other of, the set of network capability thresholds available to them, through the use of optional parameters defined within the packets. When communicated during the established connection, these parameters will drive the functionality of the protocol, helping effectively manage the bandwidth available, and mitigate any negative factors interfering with the flow of data e.g. latency, congestion and packet loss.

Normally, users access information online through human readable domain names. However, web browsers interact only through Internet protocol (IP) addresses. DNS facilitates in translating or in other words resolving the domain names into numerical IP addresses so that web browsers can direct the user to the targeted internet resources.

DNS is an acronym for Domain Name Services and is a standard protocol enabling the internet user to be directed to the target resource. Resolving domain names into numerical IP addresses is vital for locating and identifying target websites, servers, or devices along with underlying network protocols.

DNS resolving is carried out by a DNS resolver also known as a recursive resolver, which is a server designed to receive DNS queries from web browsers and other applications. A DNS query or a DNS request is a demand for information sent from a user's device to a DNS server, in most cases DNS request is sent in order to ask for the IP address associated with a domain name. The resolver receives the domain name and directs it to the root server and receives the details of Top-Level Domain name (TLD) server. Through the TLD name server, the root server receives the details of an authoritative name server and requests for IP addresses that match the desired domain name, the DNS query is resolved when it receives the requested IP address.

DNS filtering is the practice of blocking access to certain sites for a specific purpose, often content-based filtering. If a site, or category of sites, has been deemed a threat or potentially unwanted, then its IP address is blocked with a DNS filter and access to it is prevented. Examples of such potentially unwanted traffic includes advertising cookies that communicate with the owner of the domain or trackers.

When a user visits a webpage that uses cookies, the webpage's server will first check to see whether their browser has visited the webpage before. It does this by searching the browser's collection of cookies for any belonging to that webpage. If a previous cookie is found, the server will use that information to customize its webpage accordingly (e.g., by setting the browser's preferred currency).

If the server does not find any previous cookies belonging to the webpage, it will instruct a new cookie to be sent to the person's computer through a piece of code known as an HTTP header. The following is an example of the particular HTTP header responsible for sending a cookie from a server to a browser, which is known as Set-cookie:

Set-Cookie: cookie=sage; domain=sagepub.com; path=/ cookies;

expires=Sun, 1 Jan. 2021 00:00: 00 GMT; secure; HttpOnly

The digital communication made possible by Internet Protocols allows for brand-based communication across multiple platforms, thus comprising internet advertising. For example, a website may allow third parties to send and access their own persistent cookies through its website. A website does this by embedding within its webpages an element (often an image) from the third party. From this element, the third party can send and access its own cookies previously stored on the person's computer.

Targeted advertising typically works by using persistent third-party cookies to construct a profile of a person's Internet browsing habits and is generally carried out by specialist Internet advertising companies. Web pages that use targeted advertising will embed on their webpage an element from the advertising company. When a user's browser accesses the website, the advertising company's embedded element searches for any previous cookies belonging to it stored on his or her computer (or creates a new one if no previous cookie is found). This cookie contains a unique identifier that attaches to the browser. This allows the advertising company to track which websites the browser has visited and to offer personalized advertisements based on the person's browsing habits.

Although these cookies are technically anonymous (browsers are only known by their unique identifier), this anonymity is not always retained. For instance, it is possible to link a browser's unique identifier with personal identifying information that a person has entered on a webpage or social media networking site (e.g., their name or address). This allows the advertising company to create a detailed profile about that person's browsing habits, which is then linked to their personal information. These profiles are potentially very valuable and may be sold to other organizations wishing to use the information for marketing purposes.

Other examples of trackers can be implemented without the use of cookies. For example, trackers can be present with software developer kits (SDKs) of mobile applications or analytic tracking platforms that may or may not use cookies in their implementation. Such trackers could also be filtered through DNS filtering.

This profile building is potentially unwanted by the user and they might choose to limit and block the activity by trackers. The current embodiments present a method by which the VPN service provider infrastructure can block the usage of trackers and present to the user aggregated information about the filtering activities.

SUMMARY

Embodiments disclosed herein provide methods and systems to filter potentially unwanted traffic from trackers, third-party cookies, malicious websites or other sources and present the aggregated results of said filtering to the VPN user.

One of the embodiments enables a VPN user to opt-in or opt-out from the filtering activities while being able to access the aggregated information about filtering. In another embodiment, the user can choose to customize the filtering parameters to add or remove specific targets from the filtering policies.

DESCRIPTION OF DIAGRAMS

DETAILED DESCRIPTION

Figure 1:
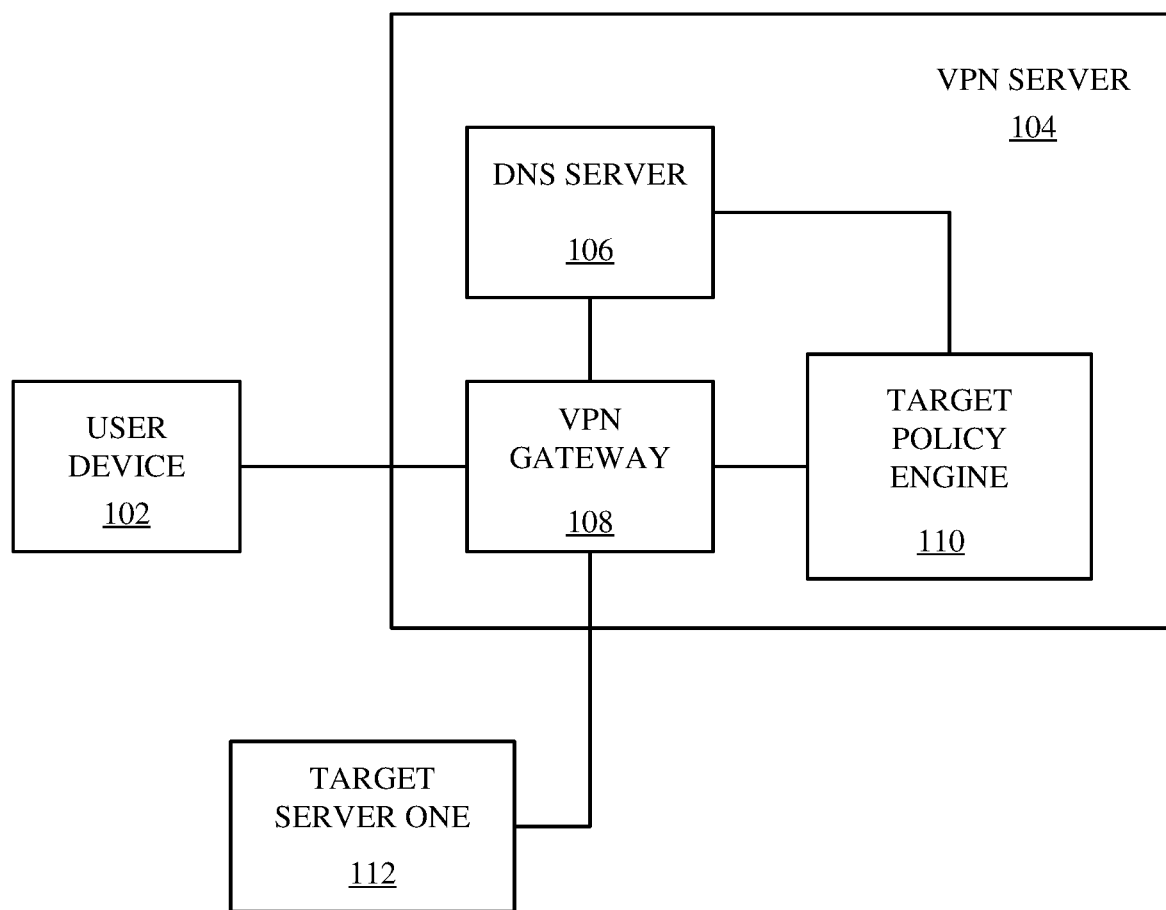
FIG. 1 shows a block diagram of an exemplary architectural depiction of components.

Some general terminology descriptions may be helpful and are included herein for convenience and are intended to be interpreted in the broadest possible interpretation. Elements that are not imperatively defined in the description and should have the meaning as would be understood by the person skilled in the art.

User Device 102—can be any computing device where a person installs and executes the application that delivers VPN connectivity. It can include any physical device that is connected to a network, including, for example, a laptop, a mobile phone, a tablet computer, a desktop computer, or any other smart device, also routers and other network devices. User Device 102 can also be a device, which is capable of network connectivity, but not primarily intended for networking, such as connected home appliances, smart home security systems, autonomous farming equipment, wearable health monitors, smart factory equipment, wireless inventory trackers, biometric cybersecurity scanners, shipping containers, and others.

VPN Server 104—a physical server that is configured to host and deliver VPN services to any number of User Device 102. The VPN Server 104 is a combination of hardware and software that allow User Device 102 to connect to a secure private network. The VPN server consists of Target Policy Engine 110, VPN Gateway 108, and DNS Server 106. In some embodiments, Target Policy Engine 110 and VPN Gateway 108 can be combined into a single hardware or software unit.

DNS Server 106—a constituent of the VPN Server that provides translation of domain names to the respective IP addresses. DNS Server 106 is a combination of hardware and software that enables it to resolve domain requests made by User Device 102. It uses a standard protocol that is responsible for providing the IP addresses for domains requested by User Device 102. It can also be a separate physical server or on a cloud containing lists of IP addresses.

VPN Gateway 108—a computing device and a constituent of VPN Server 104. It accepts User Device 102 requests for establishing encrypted connection, or tunnel, and is the endpoint of such encrypted connections from multiple User Devices 102. As a standard with VPN tunneling protocol endpoints, on establishing a VPN connection, or tunnel, with User Device 102, VPN Gateway 108 becomes the default gateway for User Device 102.

Target Policy Engine 110—a logical unit and a constituent of VPN Server 104, that can execute complex functions. It can be in a combination of hardware and software that is able to aggregate traffic filtering results and accept and formulate custom filtering rules.

Target Server One 112—is an exemplary instance of a target server. Target Server is a server serving any kind of media content accessible over many available protocols over the Internet. A Target can be, for example, a particular IP address, a domain name, and/or a hostname, possibly with a defined network protocol port, that represent(s) a resource address at a remote system serving the content accessible through industry standard protocols. A Target server is the physical or cloud server that contains the content requested through the target address.

Network Filtering—a process by which the filtered requests of User Device 102 return an error instead of a successful response from the Target Server One 112. In one embodiment, the filtering is based on DNS resolution.

Root server—a server that supports the DNS Server 106 by directly responding to the DNS requests and by returning a list of authoritative name servers for the appropriate top-level domain (TLD). Root server is an important part of the DNS Server 106 because it delegates the first step in translating the User device's 102 requests into IP addresses.

Authoritative name servers—a server that provides response to DNS requests or queries by providing IP addresses of the requested domain name. It provides original and definitive answers to DNS requests/queries as opposed to providing cached answers that were obtained from another name server.

DNS query—is a demand for information sent from the User Device 102 to a DNS Server 106. In most cases a DNS request is sent, to ask for the IP address associated with a domain name.

Private IP address—An IP address within certain ranges of IP addresses or subnets, that are set aside for User Device 102 in a VPN network. It is assigned to the User Devices 102 by the VPN Gateway 108 when the VPN connectivity is established. These private IP addresses are not visible on the Internet. Private IP addresses are unique to every VPN tunnel on a particular VPN server for the duration of a VPN session.

Tunneling or Tunnel—a protocol that allows for the secure movement of data from one network to another. Tunneling involves allowing private network communications to be sent across a public network, such as the Internet, through a process called encapsulation. The encapsulation process allows for data packets to appear as though they are of a public nature to a public network when they are actually private data packets, allowing them to pass through unnoticed. Encapsulation allows the packets to arrive at their proper destination. At the final destination, decapsulation and decryption occur.

Aggregated data—is a collection of information that includes at least some arithmetical aggregation, like the frequency, intervals, and schedule at which websites are blocked or allowed as well as the geolocation of the blocked or allowed targets, types of services, type of unwanted application—malicious website, phishing, malware, adware, and others. The data can be further aggregated into average values, average intervals and timestamps, average blocked or allowed traffic, average response time, most/least visited targets, filtering or blocking rate, variations in which median and percentile groups are used instead of average values, and others, in any combination and with any weights associated with the parameters.

Filtering rule—is a network rule that allows or halts incoming and outgoing packets based on the IP address or a domain name of the destination. The rules are implemented in DNS Server 106 to return an error or no-target response for a specific kind of domain name or IP address. When a domain name or an IP address from the filtering rule is requested, the domain name resolution returns an error. A set of filtering rules can comprise a blocklist that includes a full list for domain names or IP addresses specified for a particular User Device 102 or an existing tunnel via a private IP address in the VPN server subnet. Filtering rules can be added to the blocklist or removed from it either by User Device 102 or VPN Server 104.

FIG. 1 shows an exemplary overall architecture of the current embodiment that comprises of User Device 102, which can be any computing or a networking device (e.g., a personal computer, mobile phone, a tablet computer, router, smart home device) having access (e.g. Internet connection) to a particular network, a VPN Server 104, and Target Server One 112. All of the said components of the embodiments have access to a network and are able to interact with each other through the same. A network can be any digital telecommunication network that permits several nodes to share and access resources, e.g. local-area network (LAN), wide-area networks (WANs), campus-area networks (CANs), metropolitan-area networks (MANs), home-area networks (HANs), Intranet, Extranet, Internetwork, Internet.

The VPN Server 104 in turn contains the following: DNS Server 106, VPN Gateway 108, Target Policy Engine 110. While the elements shown in the FIG. 1 implement the exemplary embodiment, some elements in other embodiments can have different titles or can be combined into a single element instead of two separate elements. However, the functionality of elements and the flow of information between the elements is not impacted generally by such combinations or consolidations. Therefore, FIG. 1 as shown should be interpreted as exemplary only, and not restrictive or exclusionary of other features, including features discussed in other areas of this disclosure here within.

DNS requests and the resolution of the same occurs between User Device 102 and the DNS Server 106. It involves translating a human-friendly domain name into its respective IP address. In one embodiment, VPN Gateway 108 and Target Policy Engine 110 can be two different elements present within the VPN Server 104. VPN Gateway 108 is responsible for establishing the tunneling protocol with User Device 102 and also responsible for forwarding User Device 102 requests. Target Policy Engine 110 enforces filtering rules and aggregates filtering data.

The Primary purpose of the embodiment described herein is to effectively filter the potentially unwanted traffic, aggregate, and report the results of said filtering.

When User Device 102 initiates a connection to the VPN Server 104 through a network, the VPN Gateway 108 provides point to point contact with User Device 102 and establishes a secure connection with it. VPN connectivity is established by an encrypted tunneling protocol. All requests from User Device 102 are sent through this encrypted tunnel where the request packets are encoded and secure. This encoding of packets is known as the encapsulation and enables data packets to appear as though they are of a public nature to a public network but in fact they are actually private data packets, making them to pass unnoticed. During the establishment of this point to point tunneling connection, VPN Gateway 108 assigns a private IP address to User Device 102 that is different from the original IP address. All requests originating from User Device 102 have this new private IP address assigned to it. Also, one must note that this private IP address is exclusive to the individual user device within the VPN server but it is not globally unique—other users on other servers might have the same private IP address. However, since the private IP address is only used for communications between a particular VPN Server 104 and User Device 102, there is no ambiguity.

Once User Device 102 establishes a secure connection with VPN Server 104, all requests originating from User Device 102 are sent through the VPN Server 104 on behalf of User Device 102. When User Device 102 initiates a request for accessing a media streaming server (for example, Target Server One 112) through a domain name, the DNS Server 106 present within the VPN Server 104 resolves the domain name to the respective IP address. The DNS Server 106 receives the domain name and directs it to the root server and receives the details of Top-Level Domain name (TLD) server. Through the TLD name server, the root server receives the details of an authoritative name server and requests for IP addresses that match the desired domain name and receives it. Through these subsequent steps DNS Server 106 within the VPN Server 104 resolves the domain name requests sent by User Device 102.

However, DNS Server 106 can receive policies from Target Policy Engine 110 to modify domain resolution rules and instead of returning the requested IP address, return an error page or any other content that indicates potentially unwanted traffic.

User Device 102 can request aggregated data on how many requests have been identified as potentially unwanted traffic and this statistic can be returned based on the private IP assigned to User Device 102. Once User Device 102 disconnects and the tunnel is terminated, the aggregated data can also be deleted based on the private IP assigned to User Device 102 when the tunnel is established.

The following figures illustrate this process and the various embodiments involved with more technical detail.

Figure 2A:
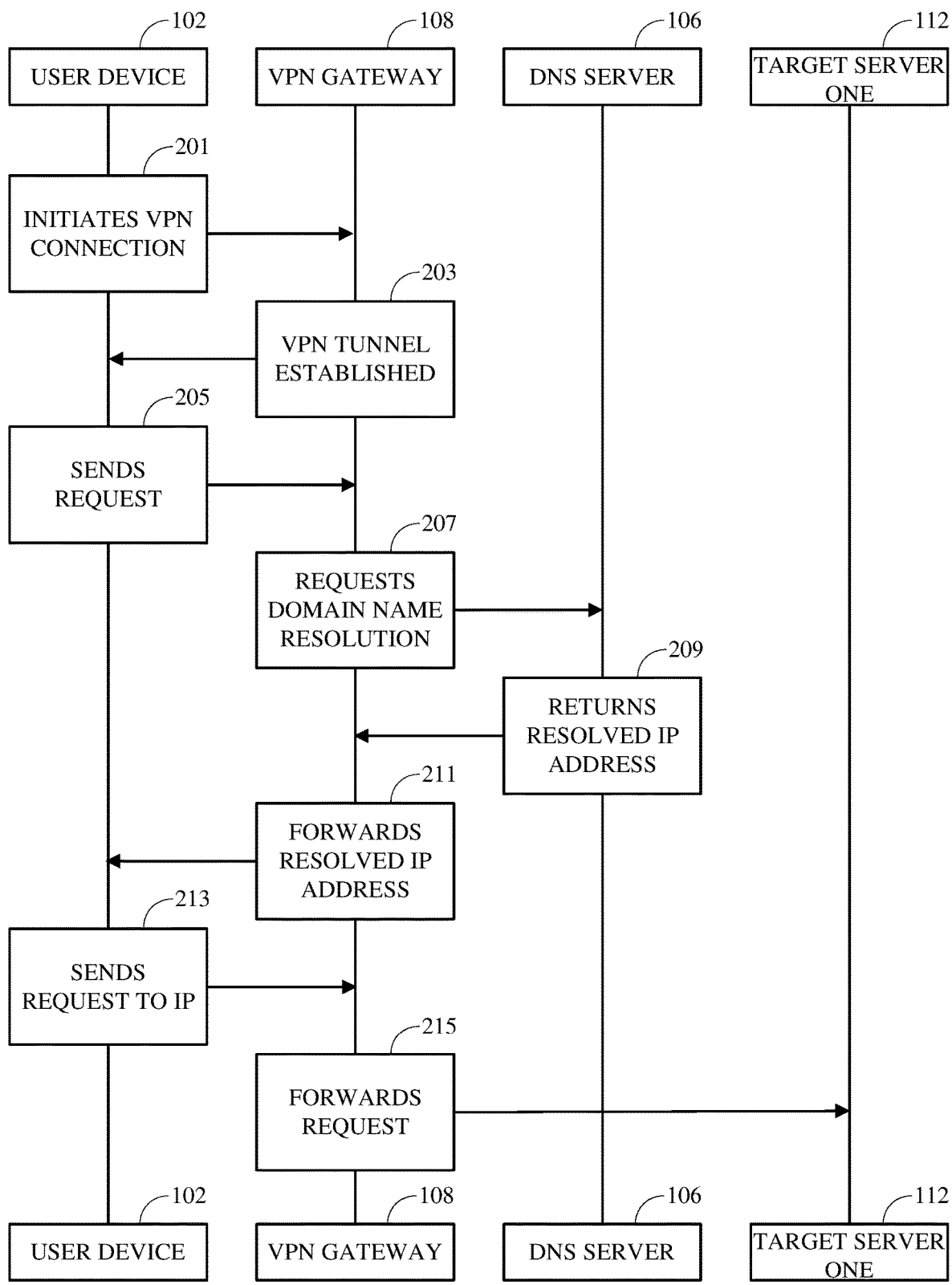
FIG. 2A shows an exemplary flow diagram of a data exchange cycle through VPN without traffic filtering.

FIG. 2A shows an exemplary flow diagram of a data exchange cycle through VPN without traffic filtering.

The technology represented in FIG. 2 does not take advantage of traffic filtering or aggregated data collection and thus represents the prior art in the field. The current embodiments incorporate the VPN data exchange but build on it to enable traffic filtering and data aggregation.

In step 201, User Device 102 initiates a VPN connection with VPN Server 104 and more specifically by addressing VPN Gateway 108. This action on User Device 102 can happen through a software application installed on User Device 102 that has a dashboard or other user interface. However, User Device 102 can engage in a VPN connection with the VPN Gateway 108 by configuring their system network settings more directly.

In step 203, Once VPN Gateway 108 receives the request to connect, it creates a VPN tunnel between itself and User Device 102. The tunnel is established by VPN Gateway 108 receiving User Device 102 requests from its public IP address, then returning a response with a newly assigned private IP address and a private IP address of the VPN Gateway 108 through which User Device 102 can communicate with VPN Gateway 108 in a private way. All the subsequent communication is done through the tunnel created by User Device 102 and VPN Gateway 108. The connection is private (secure) because symmetric cryptography is used to encrypt the data transmitted. Usually, the keys for this symmetric encryption are generated uniquely for each connection and are based on a shared secret that was negotiated at the start of the session. The server and client negotiate the details of which encryption algorithm and cryptographic keys to use before the first byte of data is transmitted. The negotiation of a shared secret is both secure (the negotiated secret is unavailable to eavesdroppers and cannot be obtained, even by an attacker who places themselves in the middle of the connection) and reliable (no attacker can modify the communications during the negotiation without being detected).

The identity of the communicating parties can be authenticated using public-key cryptography. This authentication can be optional but is generally required for at least one of the parties (typically the server). The connection is reliable because each message transmitted includes a message integrity check using a message authentication code to prevent undetected loss or alteration of the data during transmission.

In step 205, after the VPN tunnel is established and secured, User Device 102 is able to make requests and access the target servers privately without its public IP being revealed. Once a User Device 102 makes a request to access a domain Target Server One 112, VPN Server 104 receives the request at Gateway 108.

In step 207, Gateway 108 addresses DNS Server 106 to resolve the domain name of the request into the target IP address.

In step 209, DNS Server 106 resolves the IP address and returns it to Gateway 108.

In step 211, Gateway 108 forwards the resolved IP address to User Device 102.

In step 213, User Device 102 makes a request to the IP address that is transferred through the established VPN tunnel to VPN Gateway 108.

In step 215, VPN Gateway 108 makes a request to Target Server One 112 for the data specified in the request from User Device 102. The type of data can be an HTTP response, a streaming service or any other media or data entity. The applications of the current embodiments are not limited by a particular protocol or the type of target that is being accessed.

Figure 2B:
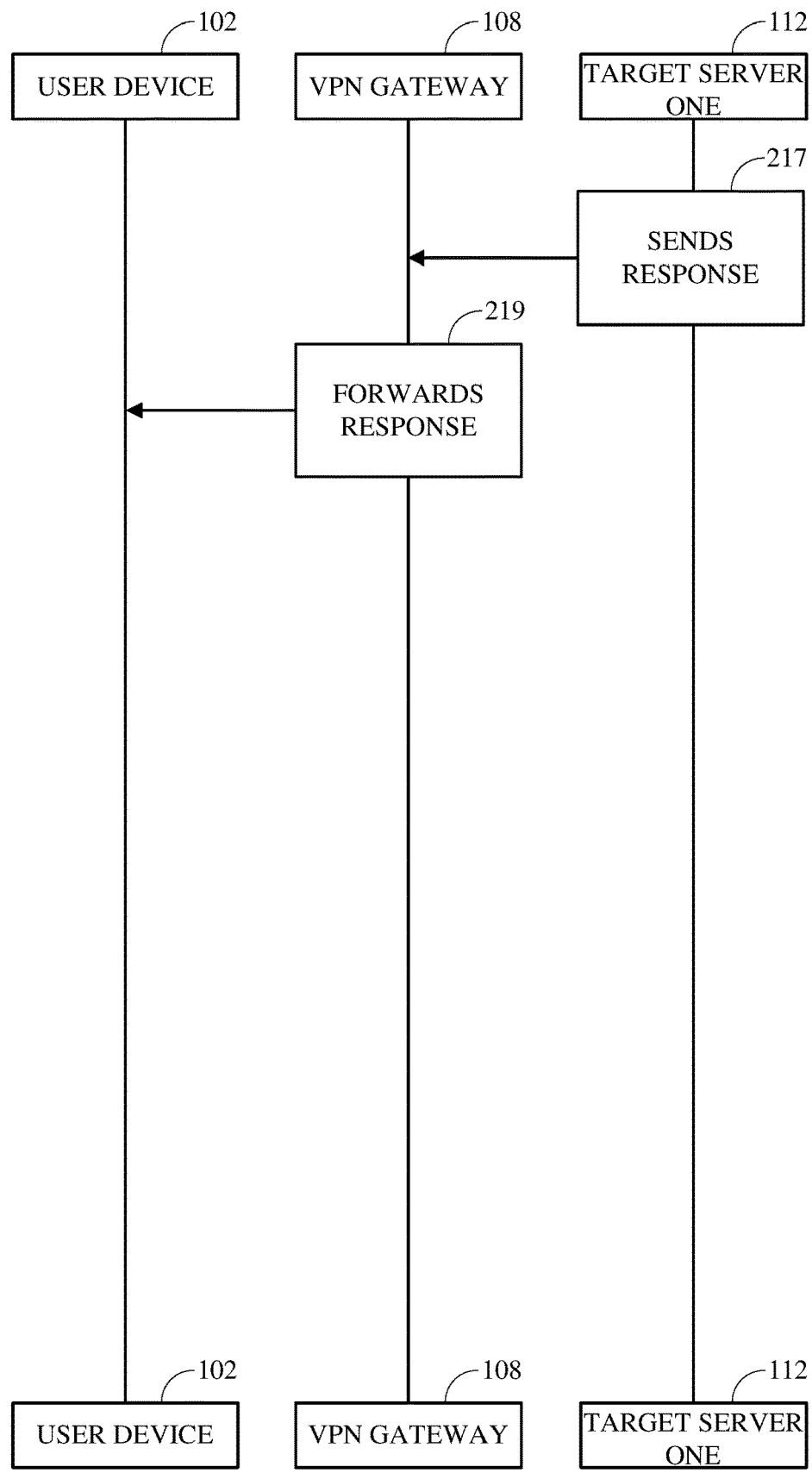
FIG. 2B shows the continuation of the exemplary flow diagram of a data exchange cycle through VPN without traffic filtering.

FIG. 2B shows the continuation of the exemplary flow diagram of a data exchange cycle through VPN without traffic filtering.

In step 217, Target Server One 112 returns the data specified in the original request from User Device 102 to VPN Gateway 108.

In step 219, VPN Gateway 106 returns the request data to User Device 102 over the existing VPN tunnel.

Figure 3A:
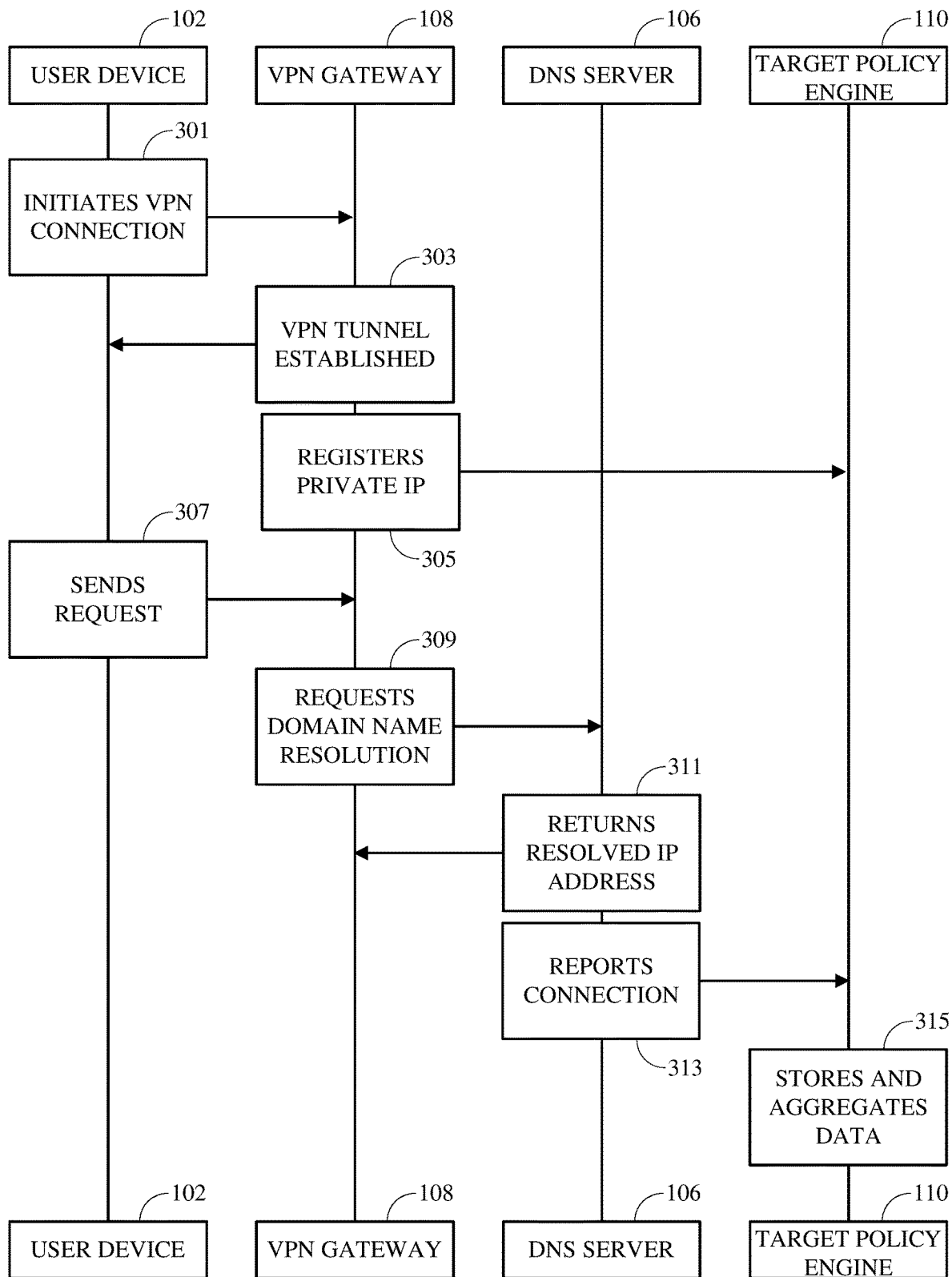
FIG. 3A shows an exemplary flow diagram of a data exchange cycle through VPN without traffic filtering and with data aggregation.

FIG. 3A shows an exemplary flow diagram of a data exchange cycle through VPN without traffic filtering and with data aggregation.

In step 301, User Device 102 initiates a VPN connection with VPN Server 104 and more specifically by addressing VPN Gateway 108. This action on User Device 102 can happen through a software application installed on User Device 102 that has a dashboard or other user interface. However, User Device 102 can engage in a VPN connection with the VPN Gateway 108 by configuring their system network settings more directly.

In step 303, Once VPN Gateway 108 receives the request to connect, it creates a VPN tunnel between itself and User Device 102. The tunnel is established by VPN Gateway 108 receiving User Device 102 requests from its public IP address, then returning a response with a newly assigned private IP address and a private IP address of the VPN Gateway 108 through which User Device 102 can communicate with VPN Gateway 108 in a private way. All the subsequent communication is done through the tunnel created by User Device 102 and VPN Gateway 108. The connection is private (secure) because symmetric cryptography is used to encrypt the data transmitted. Usually, the keys for this symmetric encryption are generated uniquely for each connection and are based on a shared secret that was negotiated at the start of the session. The server and client negotiate the details of which encryption algorithm and cryptographic keys to use before the first byte of data is transmitted. The negotiation of a shared secret is both secure (the negotiated secret is unavailable to eavesdroppers and cannot be obtained, even by an attacker who places themselves in the middle of the connection) and reliable (no attacker can modify the communications during the negotiation without being detected).

The identity of the communicating parties can be authenticated using public-key cryptography. This authentication can be optional but is generally required for at least one of the parties (typically the server). The connection is reliable because each message transmitted includes a message integrity check using a message authentication code to prevent undetected loss or alteration of the data during transmission.

In step 305, Gateway 108 registers the private IP assigned to User Device 102 in Target Policy Engine 110. More specifically, Gateway 108 (for example, using strongSwan VPN software but the current embodiments are compatible with a variety of software solutions) reports to Target Policy Engine 110 whenever User Device 102 connects and is assigned a private IP address in the subnet of the VPN server. For example, Gateway 108 may send a message stating user1,10.0.2.1,connected. In this case, the first value is the username, the second value is the IP address within the subnet, and the third value is the state change. If this user were to disconnect the message would read user1,10.0.2.1, disconnected.

In step 307, after the VPN tunnel is established and secured, User Device 102 is able to make requests and access the target servers privately without its public IP being revealed. Once a User Device 102 makes a request to access a domain Target Server One 112, VPN Server 104 receives the request at Gateway 108.

In step 309, Gateway 108 addresses DNS Server 106 to resolve the domain name of the request into the target IP address. VPN Server 104 in this case offers an alternative DNS server in order to prevent users from accessing malicious websites, communicating with tracking software, and seeing unwanted ads. This can be done in an opaque way without the user knowing what has been done. However, in the current embodiments the data is aggregated and can be used for informing User Device 102 without performing centralized data collection and allowing them to customize their experience with this tool.

In step 311, DNS Server 106 resolves the IP address and returns it to Gateway 108. DNS resolution can be performed in a variety of standardized ways.

In step 313, DNS Server 106 reports the connection fact to Target Policy Engine 110. DNS Server 106 can be prepared with a plug-in which notifies Target Policy Engine 110 according to a set of rules. For example, DNS Server 106 can be configured with a list of DNS names that are considered to be potentially malicious or unwanted. Whenever a DNS request is received that matches an address on that list, it can notify Target Policy Engine 110 by sending a message in the exemplary format 10.0.2.1,example.com where the first part is the private IP of User Device 102 in the VPN server subnet and the second part is the potentially unwanted or malicious domain. In one exemplary embodiment, an identification number is created by a hashing algorithm. It means that a unique combination of values (like the private IP of User Device 102) is hashed to make a unique string of numbers or characters that uniquely identify a VPN session. The hashed string will depend on the input or inputs used and the hashing algorithm. The combinations of hashing algorithms and inputs do not limit the scope of any of the embodiments.

In step 315, Target Policy Engine 110 stores and aggregates the blocked or allowed traffic. Every DNS resolution is a process that can be quantified as a data point in a data model, for example, an entity with attributes blocked or allowed. This would indicate to Target Policy Engine 110 that certain requests from User Device 102 have been or would have been filtered as potentially unwanted traffic.

Types of data that can be aggregated by Target Policy Engine 110 include frequency, intervals, and schedule at which websites are blocked or allowed as well as the geolocation of the blocked or allowed targets, types of services, type of unwanted application—malicious website, phishing, malware, adware, and others. The data can be further aggregated into average values, average intervals and timestamps, average blocked or allowed traffic, average response time, most/least visited targets, filtering or blocking rate, variations in which median and percentile groups are used instead of average values, and others, in any combination and with any weights associated with the parameters.

There can be various mathematical and statistical models used for data aggregation and optimization. Most models will provide a result within some confidence range but confidence ranges are not necessary. There can be additional steps added to the mechanism due to mathematical models used in optimization (for example, relaxation and approximation methods) but this fact does not change the overall structure of the mechanism or the current embodiments more generally.

Target Policy Engine 110 can run machine learning algorithms. Machine learning can be broadly defined as computational methods using aggregated data to improve performance or to make accurate predictions. Here, aggregated data refers to the past information available to the machine learning algorithm, which typically takes the form of electronic data collected and made available for analysis. Target Policy Engine 110 may run computational models such as neural networks, classification or regression trees, support vector machines, logistic regressors, Gaussian process models, or other computational models.

Figure 3B:
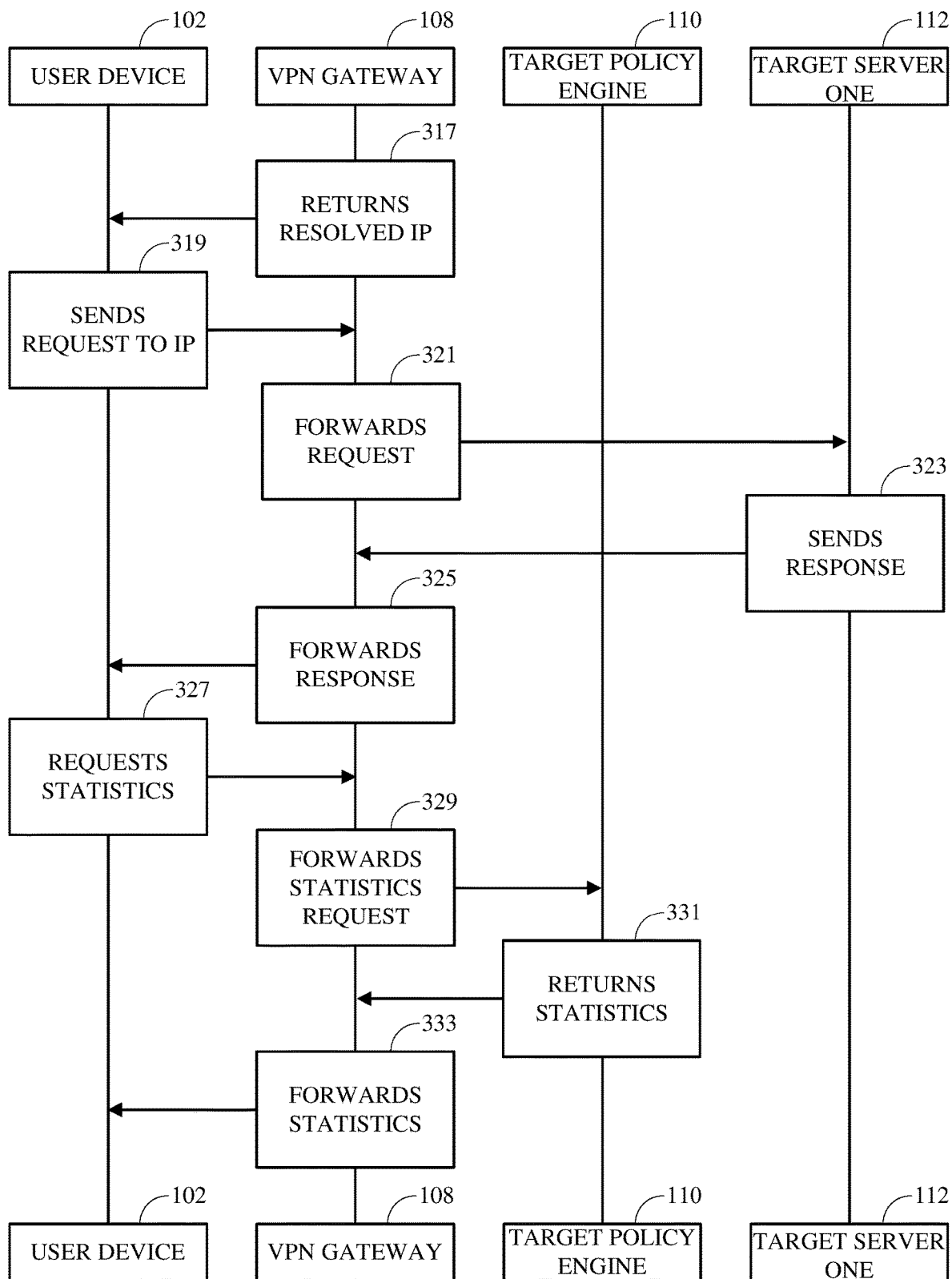
FIG. 3B shows the continuation of the exemplary flow diagram of a data exchange cycle through VPN without traffic filtering and with data aggregation.

FIG. 3B shows the continuation of the exemplary flow diagram of a data exchange cycle through VPN without traffic filtering and with data aggregation.

In step 317, Gateway 108 forwards the resolved IP address to User Device 102.

In step 319, User Device 102 makes a request to the IP address that is transferred through the established VPN tunnel to VPN Gateway 108.

In step 321, VPN Gateway 108 makes a request to Target Server One 112 for the data specified in the request from User Device 102. The type of data can be an HTTP response, a streaming service or any other media or data entity. The applications of the current embodiments are not limited by a particular protocol or the type of target that is being accessed.

In step 323, Target Server One 112 returns the data specified in the original request from User Device 102 to VPN Gateway 108.

In step 325, VPN Gateway 106 returns the request data to User Device 102 over the existing VPN tunnel.

The order of these steps can be synchronous, asynchronous or partially synchronous, depending on the configuration of the VPN service provider infrastructure. In at least some embodiments, the request by User Device 102 is serviced as a priority and the data aggregation steps can be delayed to facilitate it. However, in other cases, data aggregation can happen simultaneously without hindering the speed of processing requests and thus can happen in parallel.

The data exchange described above in steps 307 and 325 forms a complete cycle and can be reiterated multiple times before any changes are made to the existing communication. The rates of the cycle are flexible and can include, for example, one, one hundred, one thousand or ten thousand instances.

In step 327, User Device 102 requests at Gateway 108 to see aggregated data of the potentially unwanted traffic filtering. It must be noted that in this embodiment, the traffic was not actually filtered but the data has been aggregated to be presented to User Device 102 so that the policies can be enabled and any further traffic will be actually filtered.

In step 329, Gateway 108 forwards the request for aggregated data to Target Policy Engine 110 indicating the private IP address of User Device 102.

In step 331, Target Policy Engine 110 retrieves and returns the requested data to Gateway 108.

In step 333, Gateway 108 forwards the retrieved aggregated data to User Device 102.

The flow of actions described in steps 327-333 can be reiterated multiple times as User Device 102 requests for updated statistical information or aggregated data. The flow can also be executed as the other flow of actions are performed in parallel.

Figure 3C:
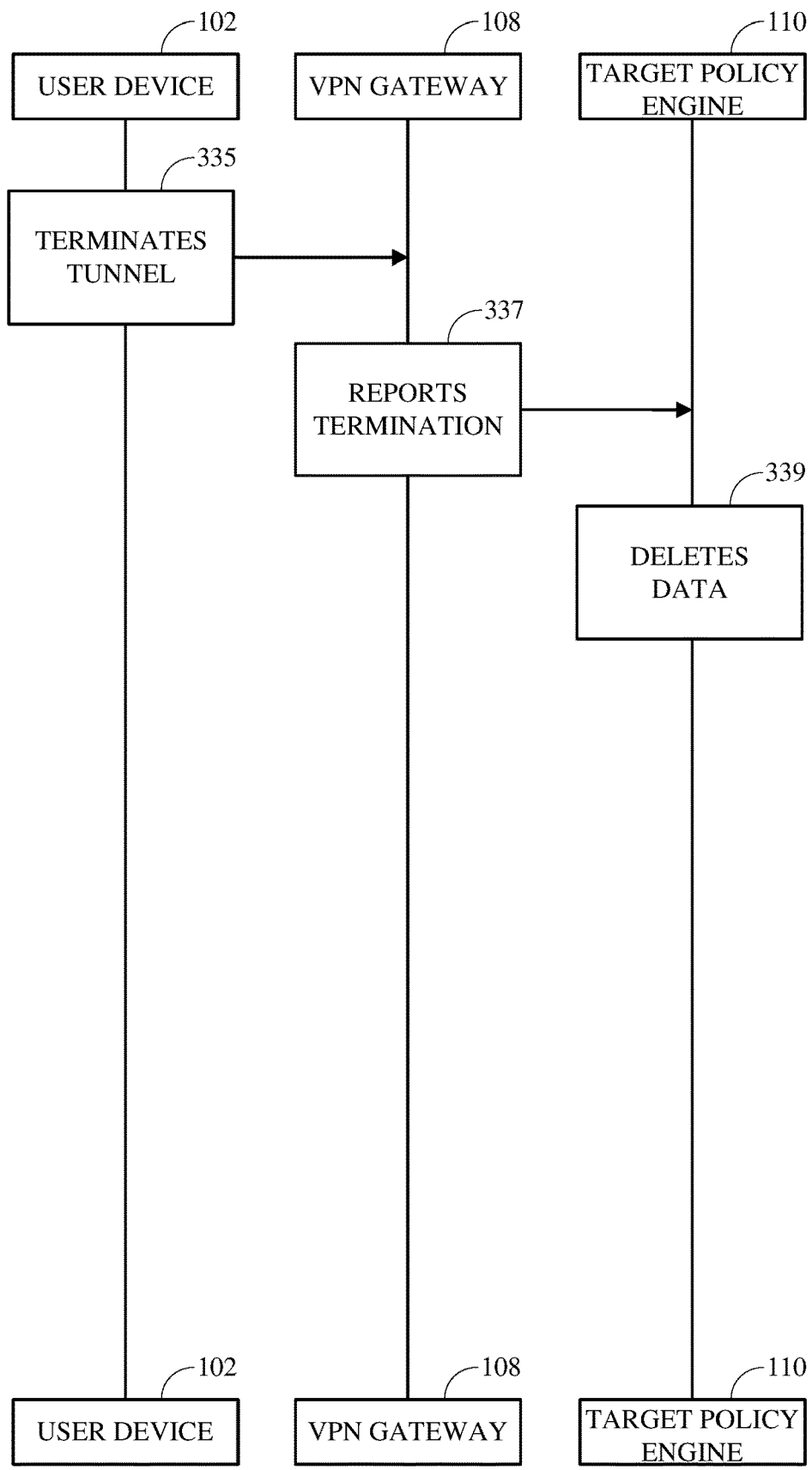
FIG. 3C shows the continuation of the exemplary flow diagram of a data exchange cycle through VPN without traffic filtering and with data aggregation.

FIG. 3C shows the continuation of the exemplary flow diagram of a data exchange cycle through VPN without traffic filtering and with data aggregation.

In step 335, User Device 102 disconnects from VPN Gateway 108 and thus the existing VPN tunnel is terminated.

In step 337, VPN Gateway 108 informs Target Policy Engine 110 that the connection has been terminated with a particular private IP address, for example, by sending a message 10.0.2.1,disconnected.

In step 339, Target Policy Engine 110 deletes any associated data. The data can be retained for a short period in case the same user would reconnect which is particularly likely in mobile scenarios where users frequently reconnect. In that case, step 339 can be delayed for a preset short period of time, for example, ten milliseconds, ten seconds, a minute, ten minutes or ten hours. However, the primary application of the embodiments is designed to aggregate data without centralization or archiving techniques.

Figure 4A:
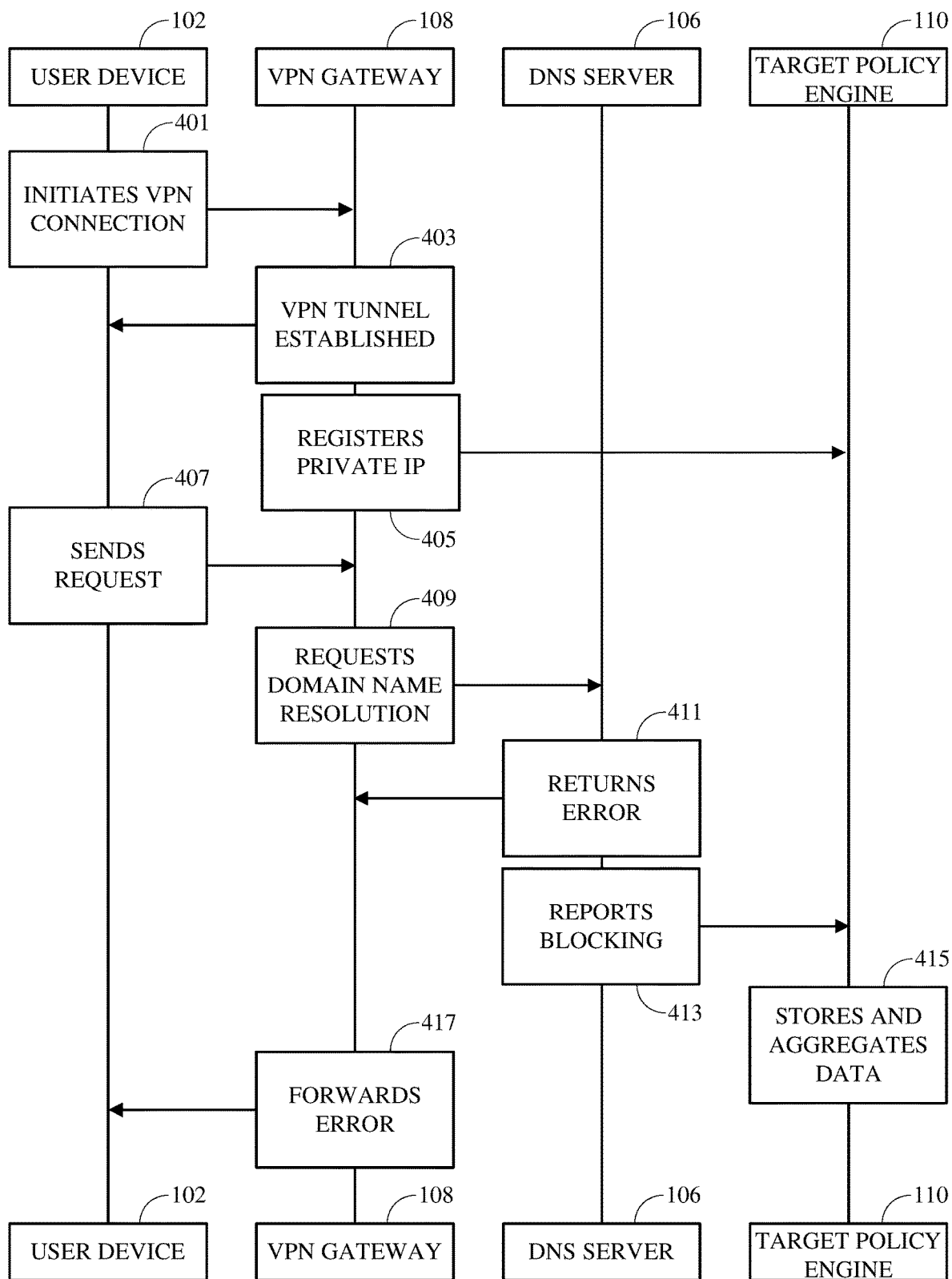
FIG. 4A shows an exemplary flow diagram of a data exchange cycle through VPN with traffic filtering and data aggregation.

FIG. 4A shows an exemplary flow diagram of a data exchange cycle through VPN with traffic filtering and data aggregation.

In step 401, User Device 102 initiates a VPN connection with VPN Server 104 and more specifically by addressing VPN Gateway 108. This action on User Device 102 can happen through a software application installed on User Device 102 that has a dashboard or other user interface. However, User Device 102 can engage in a VPN connection with the VPN Gateway 108 by configuring their system network settings more directly.

In step 403, Once VPN Gateway 108 receives the request to connect, it creates a VPN tunnel between itself and User Device 102. The tunnel is established by VPN Gateway 108 receiving User Device 102 requests from its public IP address, then returning a response with a newly assigned private IP address and a private IP address of the VPN Gateway 108 through which User Device 102 can communicate with VPN Gateway 108 in a private way. All the subsequent communication is done through the tunnel created by User Device 102 and VPN Gateway 108. The connection is private (secure) because symmetric cryptography is used to encrypt the data transmitted. Usually, the keys for this symmetric encryption are generated uniquely for each connection and are based on a shared secret that was negotiated at the start of the session. The server and client negotiate the details of which encryption algorithm and cryptographic keys to use before the first byte of data is transmitted. The negotiation of a shared secret is both secure (the negotiated secret is unavailable to eavesdroppers and cannot be obtained, even by an attacker who places themselves in the middle of the connection) and reliable (no attacker can modify the communications during the negotiation without being detected).

In step 405, Gateway 108 registers the private IP assigned to User Device 102 in Target Policy Engine 110. More specifically, Gateway 108 (for example, using strongSwan VPN software but the current embodiments are compatible with a variety of software solutions) reports to Target Policy Engine 110 whenever User Device 102 connects and is assigned a private IP address in the subnet of the VPN server. For example, Gateway 108 may send a message stating user1,10.0.2.1,connected. In this case, the first value is the username, the second value is the IP address within the subnet, and the third value is the state change. If this user were to disconnect the message would read user1,10.0.2.1, disconnected.

In step 407, after the VPN tunnel is established and secured, User Device 102 is able to make requests and access the target servers privately without its public IP being revealed. Once a User Device 102 makes a request to access a domain Target Server One 112, VPN Server 104 receives the request at Gateway 108.

In step 409, Gateway 108 addresses DNS Server 106 to resolve the domain name of the request into the target IP address. VPN Server 104 in this case offers an alternative DNS server in order to prevent users from accessing malicious websites, communicating with tracking software, and seeing unwanted ads.

In step 411, DNS Server 106 returns an error message to VPN Gateway 108 that indicates a non target response to User Device 102. DNS Server 106 can resolve the IP address of the domain name before activating filters or it can immediately detect the potentially unwanted traffic. DNS resolution can be performed in a variety of standardized ways. However, if the domain name is deemed as potentially unwanted by the default implemented policy, DNS Server 106 can return an error message to Gateway 108 instead of the IP address indicative of the requested domain name.

In step 413, DNS Server 106 reports the connection blocking or filtering fact to Target Policy Engine 110. DNS Server 106 can be prepared with a plug-in which notifies Target Policy Engine 110 according to a set of rules. For example, DNS Server 106 can be configured with a list of DNS names that are considered to be potentially malicious or unwanted. Whenever a DNS request is received that matches an address on that list, it can notify Target Policy Engine 110 by sending a message in the exemplary format 10.0.2.1,example.com where the first part is the private IP of User Device 102 in the VPN server subnet and the second part is the potentially unwanted or malicious domain. In one exemplary embodiment, an identification number is created by a hashing algorithm. It means that a unique combination of values (like the private IP of User Device 102) is hashed to make a unique string of numbers or characters that uniquely identify a VPN session. The hashed string will depend on the input or inputs used and the hashing algorithm. The combinations of hashing algorithms and inputs do not limit the scope of any of the embodiments.

In step 415, Target Policy Engine 110 stores and aggregates the blocked or allowed traffic. Every DNS resolution is a process that can be quantified as a data point in a data model, for example, an entity with attributes blocked or allowed. This would indicate to Target Policy Engine 110 that certain requests from User Device 102 have been or would have been filtered as potentially unwanted traffic.

Types of data that can be aggregated by Target Policy Engine 110 include frequency, intervals, and schedule at which websites are blocked or allowed as well as the geolocation of the blocked or allowed targets, types of services, type of unwanted application—malicious website, phishing, malware, adware, and others. The data can be further aggregated into average values, average intervals and timestamps, average blocked or allowed traffic, average response time, most/least visited targets, filtering or blocking rate, variations in which median and percentile groups are used instead of average values, and others, in any combination and with any weights associated with the parameters.

There can be various mathematical and statistical models used for data aggregation and optimization. Most models will provide a result within some confidence range but confidence ranges are not necessary. There can be additional steps added to the mechanism due to mathematical models used in optimization (for example, relaxation and approximation methods) but this fact does not change the overall structure of the mechanism or the current embodiments more generally.

Target Policy Engine 110 can run machine learning algorithms. Machine learning can be broadly defined as computational methods using aggregated data to improve performance or to make accurate predictions. Here, aggregated data refers to the past information available to the machine learning algorithm, which typically takes the form of electronic data collected and made available for analysis. Target Policy Engine 110 may run computational models such as neural networks, classification or regression trees, support vector machines, logistic regressors, Gaussian process models, or other computational models.

In step 417, Gateway 108 forwards an error to connect messages to User Device 102. The message can be customized to contain more information than mere error, for example it can include the reasons for why the domain was blocked or suggestions to include custom policies to change the filtering. However, such customizations do note change the overall functioning of the embodiments.

The order of these steps can be synchronous, asynchronous or partially synchronous, depending on the configuration of the VPN service provider infrastructure. In at least some embodiments, the request by User Device 102 is serviced as a priority and the data aggregation steps can be delayed to facilitate it. However, in other cases, data aggregation can happen simultaneously without hindering the speed of processing requests and thus can happen in parallel.

The data exchange described above in steps 407 and 417 forms a complete cycle and can be reiterated multiple times before any changes are made to the existing communication. The rates of the cycle are flexible and can include, for example, one, one hundred, one thousand or ten thousand instances.

Figure 4B:
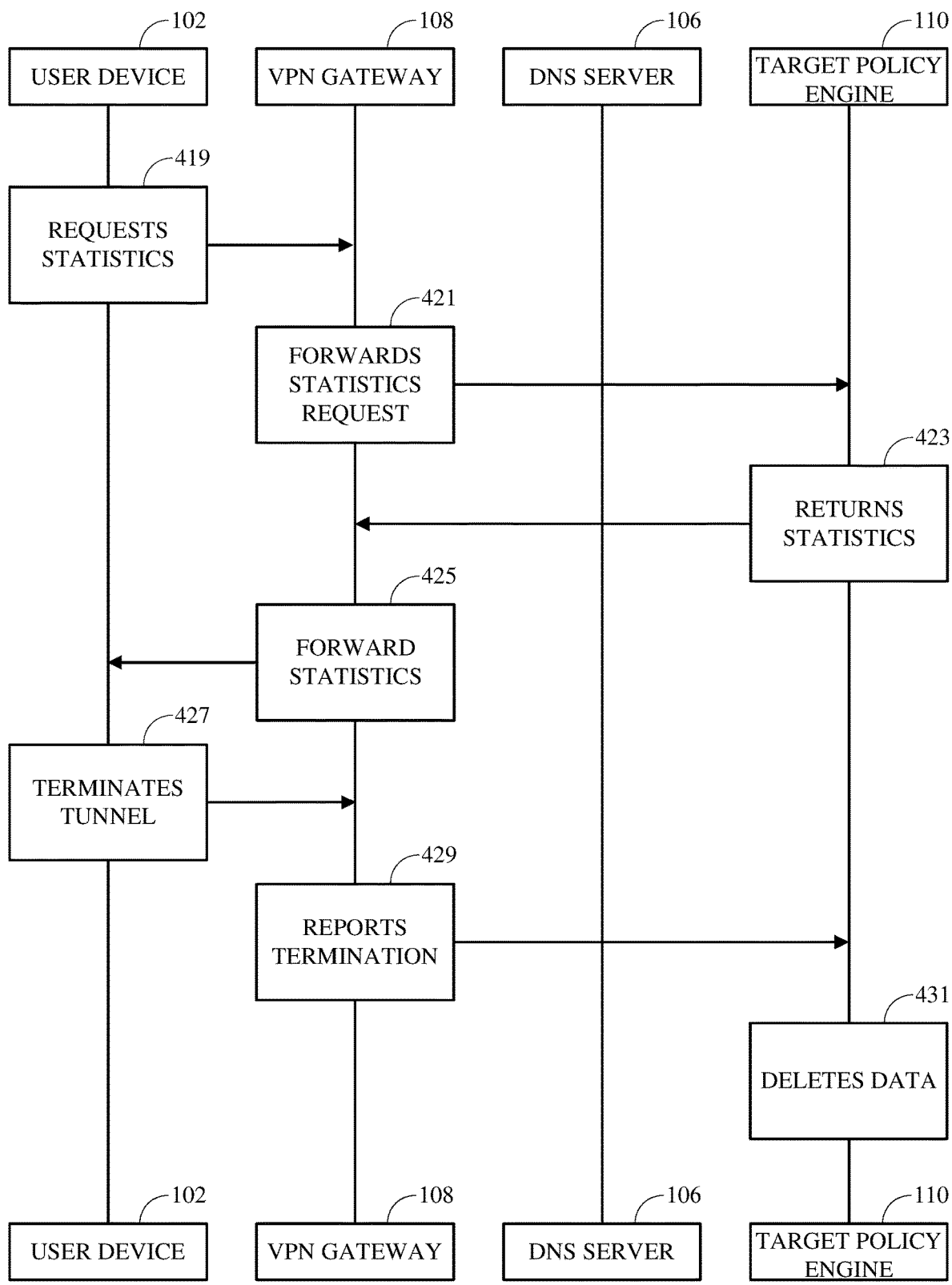
FIG. 4B shows the continuation of the exemplary flow diagram of a data exchange cycle through VPN with traffic filtering and data aggregation.

FIG. 4B shows the continuation of the exemplary flow diagram of a data exchange cycle through VPN with traffic filtering and data aggregation.

In step 419, User Device 102 requests at Gateway 108 to see aggregated data of the potentially unwanted traffic filtering. The data has been aggregated to be presented to User Device 102.

In step 421, Gateway 108 forwards the request for aggregated data to Target Policy Engine 110 indicating the private IP address of User Device 102.

In step 423, Target Policy Engine 110 retrieves and returns the requested data to Gateway 108 based on the private IP address of User Device 102 within the VPN server subnet.

In step 425, Gateway 108 forwards the retrieved aggregated data to User Device 102.

The flow of actions described in steps 419-425 can be reiterated multiple times as User Device 102 requests for updated statistical information or aggregated data. The flow can also be executed as the other flow of actions are performed in parallel.

In step 427, User Device 102 disconnects from VPN Gateway 108 and thus the existing VPN tunnel is terminated.

In step 429, VPN Gateway 108 informs Target Policy Engine 110 that the connection has been terminated with a particular private IP address, for example, by sending a message 10.0.2.1,disconnected.

In step 431, Target Policy Engine 110 deletes any associated data. The data can be retained for a short period in case the same user would reconnect which is particularly likely in mobile scenarios where users frequently reconnect. In that case, step 431 can be delayed for a preset short period of time, for example, ten milliseconds, ten seconds, a minute, ten minutes or ten hours. However, the primary application of the embodiments is designed to aggregate data without centralization or archiving techniques.

Figure 5A:
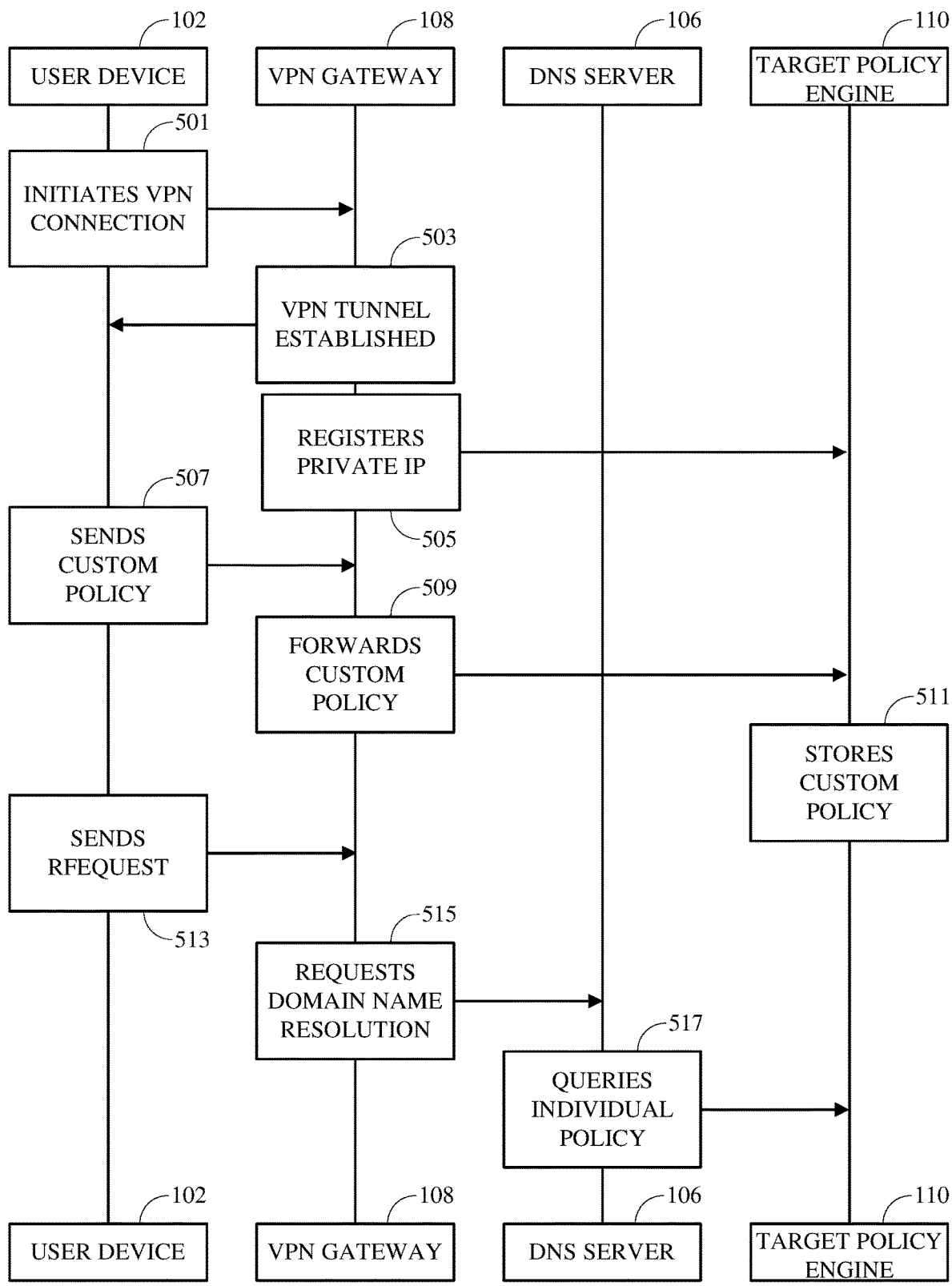
FIG. 5A shows an exemplary flow diagram of a data exchange cycle through VPN with custom traffic filtering and data aggregation.

FIG. 5A shows an exemplary flow diagram of a data exchange cycle through VPN with custom traffic filtering and data aggregation.

In step 501, User Device 102 initiates a VPN connection with VPN Server 104 and more specifically by addressing VPN Gateway 108. This action on User Device 102 can happen through a software application installed on User Device 102 that has a dashboard or other user interface. However, User Device 102 can engage in a VPN connection with the VPN Gateway 108 by configuring their system network settings more directly.

In step 503, Once VPN Gateway 108 receives the request to connect, it creates a VPN tunnel between itself and User Device 102. The tunnel is established by VPN Gateway 108 receiving User Device 102 requests from its public IP address, then returning a response with a newly assigned private IP address and a private IP address of the VPN Gateway 108 through which User Device 102 can communicate with VPN Gateway 108 in a private way. All the subsequent communication is done through the tunnel created by User Device 102 and VPN Gateway 108. The connection is private (secure) because symmetric cryptography is used to encrypt the data transmitted. Usually, the keys for this symmetric encryption are generated uniquely for each connection and are based on a shared secret that was negotiated at the start of the session. The server and client negotiate the details of which encryption algorithm and cryptographic keys to use before the first byte of data is transmitted. The negotiation of a shared secret is both secure (the negotiated secret is unavailable to eavesdroppers and cannot be obtained, even by an attacker who places themselves in the middle of the connection) and reliable (no attacker can modify the communications during the negotiation without being detected).

In step 505, Gateway 108 registers the private IP assigned to User Device 102 in Target Policy Engine 110. More specifically, Gateway 108 (for example, using strongSwan VPN software but the current embodiments are compatible with a variety of software solutions) reports to Target Policy Engine 110 whenever User Device 102 connects and is assigned a private IP address in the subnet of the VPN server. For example, Gateway 108 may send a message stating user1,10.0.2.1,connected. In this case, the first value is the username, the second value is the IP address within the subnet, and the third value is the state change. If this user were to disconnect the message would read user1,10.0.2.1, disconnected.

In step 507, after the VPN tunnel is established and secured, User Device 102 is able to set custom policies for traffic filtering. For example, User Device 102 can send instructions to specifically unfilter domains that are filtered by a default policy or it can send instructions to filter an additional target domain that is not covered by a default policy. The custom policies are not limited by these simple examples and it can include more specific information, like the timeframes at which custom policies change, however, that does not change the overall functioning of the embodiments.

In this particular exemplary embodiment, User Device 102 sends an instruction to include an additional domain in the filtering policy. The domain is that of Target Server One 112. The preference is received at VPN Gateway 108.

In step 509, VPN Gateway 108 forwards the preference to Target Policy Engine 110 which receives it and recognizes it and an additional policy with a private IP address attached to indicate the subject of the policy.

In step 511, Target Policy Engine 110 stores the preference with an identification that it applies to User Device 102 with a particular private IP address in the VPN server subnet. The additional preference takes priority over the existing default policy. Default and custom policies can work together by supplementing each other or the default policy can be turned off altogether, leaving only custom policies as operational.

In step 513, User Device 102 is able to make requests and access the target servers privately without its public IP being revealed. Once a User Device 102 makes a request to access a domain Target Server One 112, VPN Server 104 receives the request at Gateway 108.

In step 515, Gateway 108 addresses DNS Server 106 to resolve the domain name of the request into the target IP address. VPN Server 104 in this case offers an alternative DNS server in order to prevent users from accessing malicious websites, communicating with tracking software, and seeing unwanted ads.

In step 517, DNS Server 106 resolves the IP address and compares it to individual customized policies at Target Policy Engine 110. In this step, a decision is made whether or not the content should be filtered. The decision to filter the traffic is made at time the request is received.

DNS resolution can be performed in a variety of standardized ways. However, if the domain name is deemed as potentially unwanted by the default or custom policy, DNS Server 106 can return an error message to Gateway 108 instead of the IP address indicative of the requested domain name.

Figure 5B:
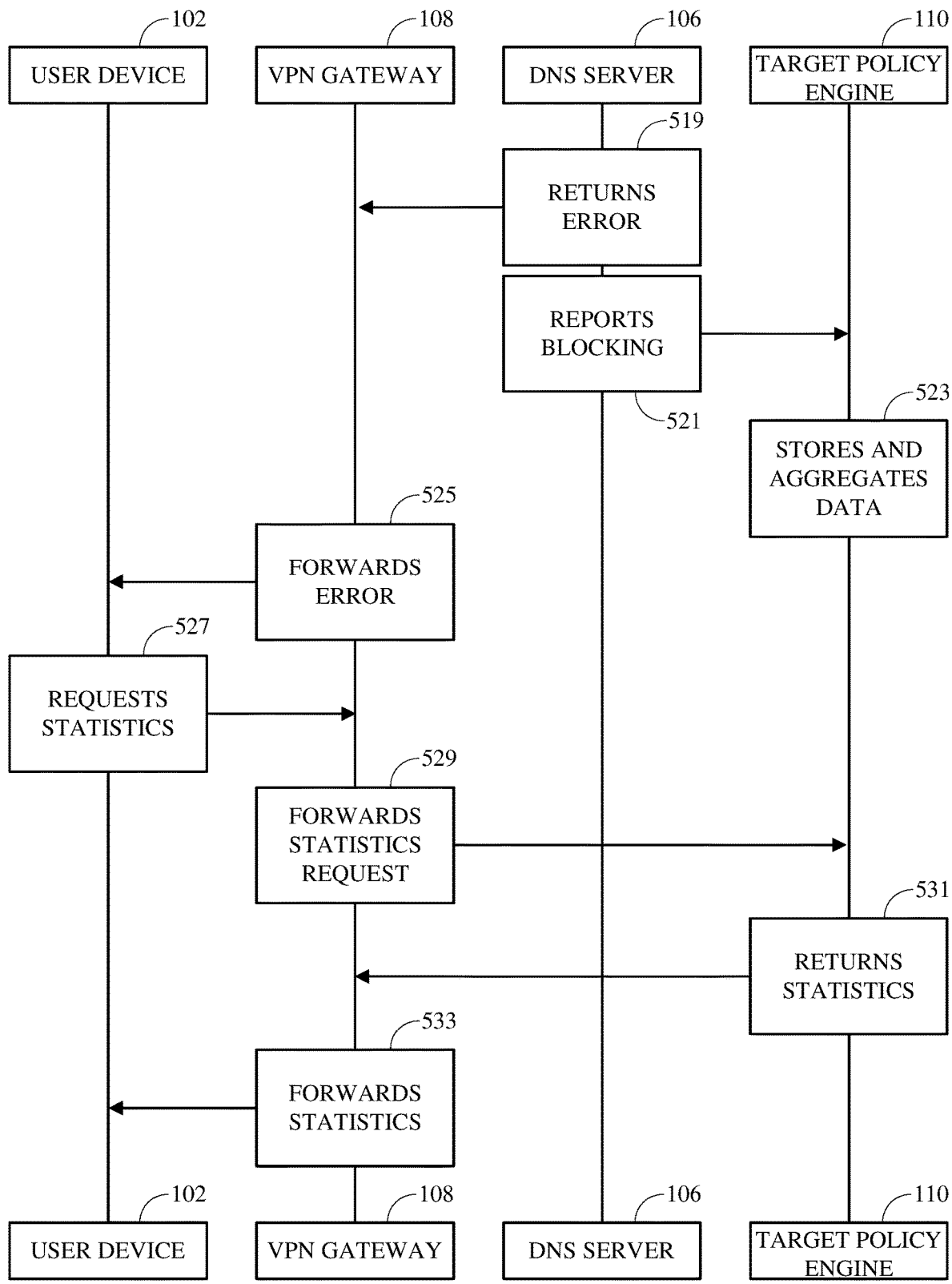
FIG. 5B shows an exemplary flow diagram of a data exchange cycle through VPN with custom traffic filtering and data aggregation.

FIG. 5B shows an exemplary flow diagram of a data exchange cycle through VPN with custom traffic filtering and data aggregation.

In step 519, DNS Server 106 returns an error message to VPN Gateway 108 that indicates a non target response to User Device 102.

In step 521, DNS Server 106 reports the connection blocking or filtering fact to Target Policy Engine 110. DNS Server 106 can be prepared with a plug-in which notifies Target Policy Engine 110 according to a set of rules. For example, DNS Server 106 can be configured with a list of DNS names that are considered to be potentially malicious or unwanted. Whenever a DNS request is received that matches an address on that list, it can notify Target Policy Engine 110 by sending a message in the exemplary format 10.0.2.1,example.com where the first part is the private IP of User Device 102 in the VPN server subnet and the second part is the potentially unwanted or malicious domain. In one exemplary embodiment, an identification number is created by a hashing algorithm. It means that a unique combination of values (like the private IP of User Device 102) is hashed to make a unique string of numbers or characters that uniquely identify a VPN session. The hashed string will depend on the input or inputs used and the hashing algorithm. The combinations of hashing algorithms and inputs do not limit the scope of any of the embodiments.

Moreover, if custom policies have been implemented from User Device 102, DNS Server 106 can indicate that a specific filtering event was caused by an individualized policy instead of a default policy.

In step 523, Target Policy Engine 110 stores and aggregates the blocked or allowed traffic. Every DNS resolution is a process that can be quantified as a data point in a data model, for example, an entity with attributes blocked, allowed, default or custom. This would indicate to Target Policy Engine 110 that certain requests from User Device 102 have been or would have been filtered as potentially unwanted traffic based on a default or custom policy.

Types of data that can be aggregated by Target Policy Engine 110 include frequency, intervals, and schedule at which websites are blocked or allowed as well as the geolocation of the blocked or allowed targets, types of services, type of unwanted application—malicious website, phishing, malware, adware, and others. The data can be further aggregated into average values, average intervals and timestamps, average blocked or allowed traffic, average response time, most/least visited targets, filtering or blocking rate, variations in which median and percentile groups are used instead of average values, and others, in any combination and with any weights associated with the parameters.

There can be various mathematical and statistical models used for data aggregation and optimization. Most models will provide a result within some confidence range but confidence ranges are not necessary. There can be additional steps added to the mechanism due to mathematical models used in optimization (for example, relaxation and approximation methods) but this fact does not change the overall structure of the mechanism or the current embodiments more generally.

Target Policy Engine 110 can run machine learning algorithms. Machine learning can be broadly defined as computational methods using aggregated data to improve performance or to make accurate predictions. Here, aggregated data refers to the past information available to the machine learning algorithm, which typically takes the form of electronic data collected and made available for analysis. Target Policy Engine 110 may run computational models such as neural networks, classification or regression trees, support vector machines, logistic regressors, Gaussian process models, or other computational models.

In step 525, Gateway 108 forwards an error to connect messages to User Device 102. The message can be customized to contain more information than mere error, for example it can include the reasons for why the domain was blocked or suggestions to include or change custom policies to change the filtering. However, such customizations do note change the overall functioning of the embodiments.

The order of these steps can be synchronous, asynchronous or partially synchronous, depending on the configuration of the VPN service provider infrastructure. In at least some embodiments, the request by User Device 102 is serviced as a priority and the data aggregation steps can be delayed to facilitate it. However, in other cases, data aggregation can happen simultaneously without hindering the speed of processing requests and thus can happen in parallel.

The data exchange described above in steps 507 and 523 forms a complete cycle and can be reiterated multiple times before any changes are made to the existing communication.

The rates of the cycle are flexible and can include, for example, one, one hundred, one thousand or ten thousand instances.

In step 527, User Device 102 requests at Gateway 108 to see aggregated data of the potentially unwanted traffic filtering. The data has been aggregated to be presented to User Device 102.

In step 529, Gateway 108 forwards the request for aggregated data to Target Policy Engine 110 indicating the private IP address of User Device 102.

In step 531, Target Policy Engine 110 retrieves and returns the requested data to Gateway 108 based on the private IP address of User Device 102 within the VPN server subnet.

In step 533, Gateway 108 forwards the retrieved aggregated data to User Device 102.

The flow of actions described in steps 519-525 can be reiterated multiple times as User Device 102 requests for updated statistical information or aggregated data. The flow can also be executed as the other flow of actions are performed in parallel.

Figure 5C:
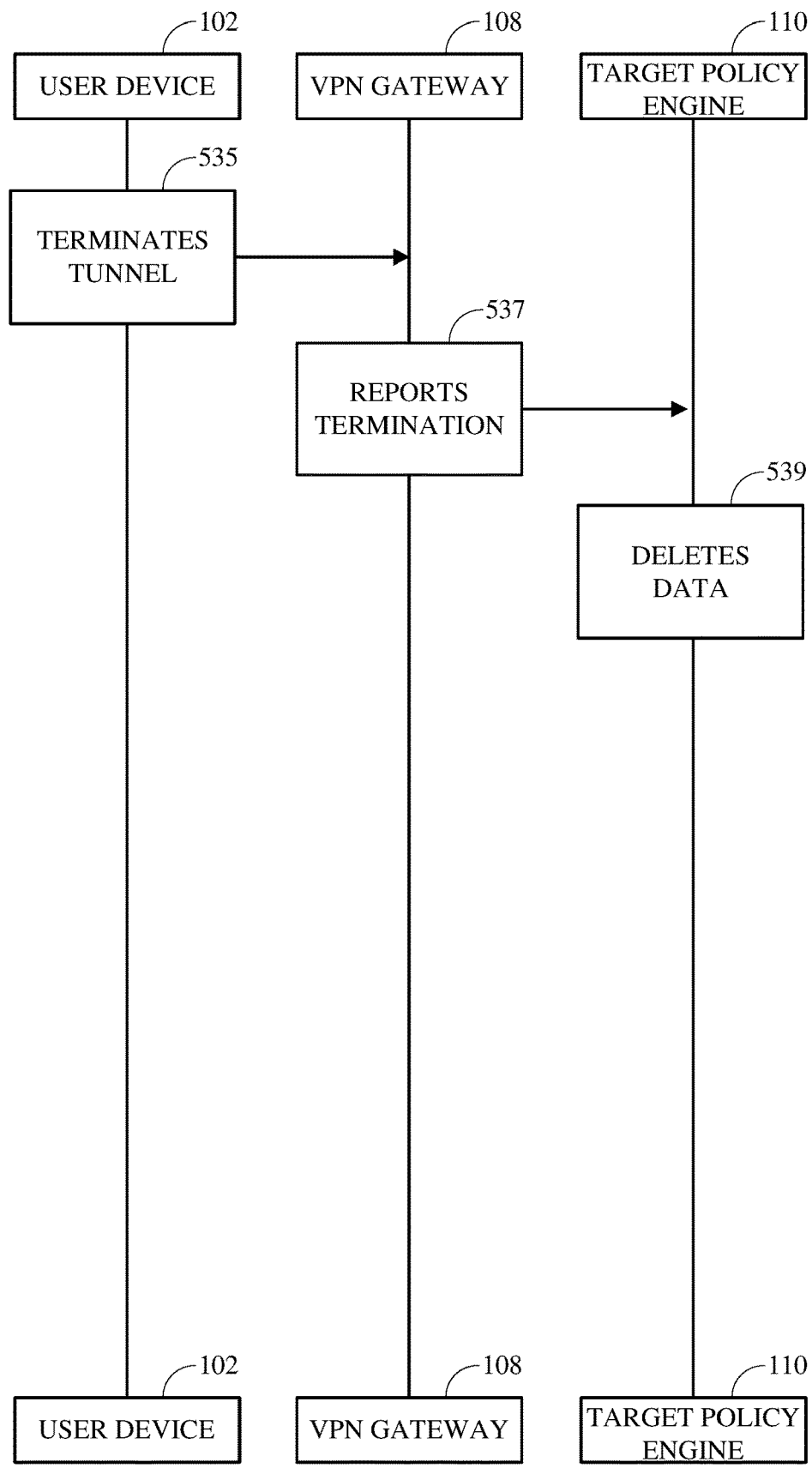
FIG. 5C shows the continuation of the exemplary flow diagram of a data exchange cycle through VPN with custom traffic filtering and data aggregation.

FIG. 5C shows an exemplary flow diagram of a data exchange cycle through VPN with custom traffic filtering and data aggregation.

In step 535, User Device 102 disconnects from VPN Gateway 108 and thus the existing VPN tunnel is terminated.

In step 537, VPN Gateway 108 informs Target Policy Engine 110 that the connection has been terminated with a particular private IP address, for example, by sending a message 10.0.2.1,disconnected.

In step 539, Target Policy Engine 110 deletes any associated data. The data can be retained for a short period in case the same user would reconnect which is particularly likely in mobile scenarios where users frequently reconnect. In that case, step 539 can be delayed for a preset short period of time, for example, ten milliseconds, ten seconds, a minute, ten minutes or ten hours. However, the primary application of the embodiments is designed to aggregate data without centralization or archiving techniques.

Custom policies can also be saved for the same or different short period of time at which User Device 102 might reconnect.

Figure 6:
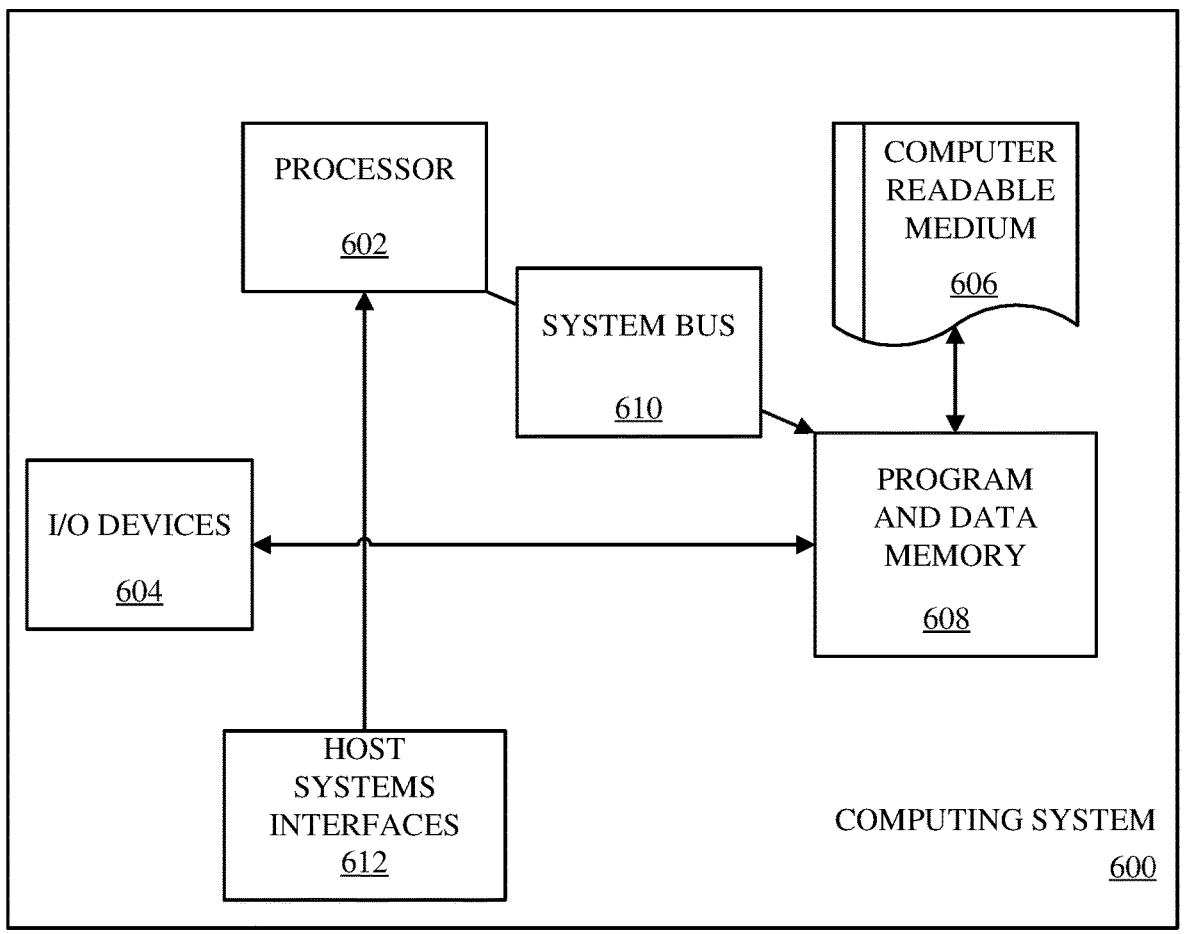
FIG. 6 shows a computing system in which a computer readable medium may provide instructions for performing any of the methods and processes disclosed herein.

The embodiments herein may be combined in a variety of ways as a matter of design choice. Accordingly, the features and aspects herein are not intended to be limited to any particular embodiment. Furthermore, the embodiments can take the form of hardware, firmware, software, and/or combinations thereof. In one embodiment, such software includes but is not limited to firmware, resident software, microcode, etc. FIG. 6 illustrates a computing system 600 in which a computer readable medium 606 may provide instructions for performing any of the methods and processes disclosed herein.

Furthermore, some aspects of the embodiments herein can take the form of a computer program product accessible from the computer readable medium 606 to provide program code for use by or in connection with a computer or any instruction execution system. For the purposes of this description, the computer readable medium 606 can be any apparatus that can tangibly store the program code for use by or in connection with the instruction execution system, apparatus, or device, including the computing system 600.

The computer readable medium 606 can be any tangible electronic, magnetic, optical, electromagnetic, infrared, or semiconductor system (or apparatus or device). Some examples of a computer readable medium 606 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 600 can include one or more processors 602 coupled directly or indirectly to memory 608 through a system bus 810. The memory 608 can include local memory employed during actual execution of the program code, bulk storage, and/or cache memories, which provide temporary storage of at least some of the program code in order to reduce the number of times the code is retrieved from bulk storage during execution.

Input/output (I/O) devices 604 (including but not limited to keyboards, displays, pointing devices, I/O interfaces, etc.) can be coupled to the computing system 600 either directly or through intervening I/O controllers. Network adapters may also be coupled to the computing system 600 to enable the computing system 600 to couple to other data processing systems, such as through host systems interfaces 612, printers, and/or storage devices through intervening private or public networks. Modems, cable modems, and Ethernet cards are just examples of network adapter types.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural form can be used, but it does not limit the scope of the disclosure and the same teaching can apply to multiple objects, even if in the current application an object is referred to in its singular form.

It will be appreciated that some embodiments describe the use of one or more generic or specialized databases (such as "Exit Nodes Database", or similar), that contains a collection of information that is organized so that it can be easily accessed, managed and updated. Computer databases typically contain aggregations of data records or files, in the current case, databases usually store different information and statistics about the proxies or exit nodes, information about utilization threshold of the exit node provider. Such databases can also contain information about the users, requests performed, networks used, exit nodes used, types of exit nodes requested and similar data. Databases are structured to facilitate the storage, retrieval, modification, and deletion of data in conjunction with various data-processing operations.

The Disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment.

The invention claimed is:

1. A method for decentralized traffic filtering statistics aggregation, the method comprising:
   receiving, at a VPN server from a user device, a request to establish a tunnel;
   establishing, at the VPN server, the tunnel with the user device;
   registering, at the VPN server, a private IP address in a VPN server subnet associated with the user device, wherein a username is registered at the VPN server together with the private IP address in the VPN server subnet associated with the user device;
   receiving, at the VPN server from the user device, a request to resolve a domain name;
   registering, at the VPN server, the request to resolve the domain name together with at least the private IP address in the VPN server subnet;
   receiving, at the VPN server from the user device, a request for aggregated information regarding the domain name resolution;
   sending, from the VPN server to the user device, the aggregated information regarding the domain name resolution, wherein the VPN server sends suggestions for an addition or a removal of filtering rules together with the requested aggregated information regarding the domain name resolution, wherein the filtering rules allow or halt incoming and outgoing packets based on the IP address or a domain name of the destination;
   receiving, at the VPN server from the user device, a notification of termination of the tunnel;
   deleting, by the VPN server, the aggregated information regarding the domain name resolution associated with the private IP address of the user device in the VPN server subnet;
   identifying, at the VPN server, the domain name resolution request as indicative of potentially unwanted traffic comprising one or more of a malicious website, a phishing website, a malware, an adware, or a third-party cookie; and
   sending, by the VPN server, to the user device an error message that a selected target is inaccessible,
   wherein the VPN server sends suggestions for an addition or a removal of filtering rules together with the error message that the selected target is inaccessible.

2. The method of claim 1, wherein a session ID of the tunnel is created using a technique which enables creation of a same session ID based on a same set of input parameters.

3. The method of claim 1, wherein the request to establish the tunnel includes cryptographic handshake information.

4. The method of claim 1, wherein the private IP address associated with the user device or the username is hashed before registering.

5. The method of claim 1, further comprising introducing a delay before the aggregated information regarding the domain name resolution is deleted.

6. The method of claim 1, further comprising:
   sending, by the user device, to the VPN server a filtering preference;
   identifying, at the VPN server, the domain name resolution matching the filtering preference;
   sending, by the VPN server, to the user device an error message that a selected target is inaccessible.

7. The method of claim 1, wherein aggregated information includes at least one of the following types of data:
   frequency, intervals, and schedule at which websites are blocked or allowed;
   geolocation of the blocked or allowed targets;
   types of potentially unwanted applications, including a malicious website, a phishing, malware, an adware, or a third-party cookie;
   further aggregated information, including average values, average intervals and timestamps, average amount of blocked or allowed traffic, average response time, most and least visited targets, total filtering or blocking rate, or variations in which median and percentile groups are used instead of average values; or
   any combination with any weights associated with the types of data.

8. A computing apparatus comprising:
   a processor; and
   a memory storing instructions that, when executed by the processor, configure the apparatus to:
   receive, at a VPN server from a user device, a request to establish a tunnel,
   establish, at the VPN server, the tunnel with the user device,
   register, at the VPN server, a private IP address in a VPN server subnet associated with the user device, wherein a username is registered at the VPN server together with the private IP address in the VPN server subnet associated with the user device,
   receive, at the VPN server from the user device, a request to resolve a domain name,
   register, at the VPN server, the request to resolve the domain name together with at least the private IP address in the VPN server subnet,
   receive, at the VPN server from the user device, a request for aggregated information regarding the domain name resolution,
   send, from the VPN server to the user device, the aggregated information regarding the domain name resolution, wherein the VPN server sends suggestions for an addition or a removal of filtering rules together with the requested aggregated information regarding the domain name resolution, wherein the filtering rules allow or halt incoming and outgoing packets based on the IP address or a domain name of the destination, receive, at the VPN server from the user device, a notification of termination of the tunnel, delete, by the VPN server, the aggregated information regarding the domain name resolution associated with the private IP address of the user device in the VPN server subnet, identifying, at the VPN server, the domain name resolution request as indicative of potentially unwanted traffic comprising one or more of a malicious website, a phishing website, a malware, an adware, or a third-party cookie, and sending, by the VPN server, to the user device an error message that a selected target is inaccessible, wherein the VPN server sends suggestions for the addition or removal of filtering rules together with the error message that the selected target is inaccessible.

9. The computing apparatus of claim 8, wherein a session ID of the tunnel is created use a technique which enables creation of a same session ID based on a same set of input parameters.

10. The computing apparatus of claim 8, wherein the instructions further configure the apparatus to:

send, by the user device, to the VPN server a filtering preference;

identify, at the VPN server, the domain name resolution matching the filtering preference;

send, by the VPN server, to the user device an error message that a selected target is inaccessible.

11. A non-transitory computer-readable storage medium, the computer-readable storage medium including instructions that when executed by a computer, cause the computer to:

receive, at a VPN server from a user device, a request to establish a tunnel;

establish, at the VPN server, the tunnel with the user device;

register, at the VPN server, a private IP address in a VPN server subnet associated with the user device, wherein a username is registered at the VPN server together with the private IP address in the VPN server subnet associated with the user device;

receive, at the VPN server from the user device, a request to resolve a domain name;

register, at the VPN server, the request to resolve the domain name together with at least the private IP address in the VPN server subnet;

receive, at the VPN server from the user device, a request for aggregated information regarding the domain name resolution;

send, from the VPN server to the user device, the aggregated information regarding the domain name resolution, wherein the VPN server sends suggestions for an addition or a removal of filtering rules together with the requested aggregated information regarding the domain name resolution, wherein the filtering rules allow or halt incoming and outgoing packets based on the IP address or a domain name of the destination;

receive, at the VPN server from the user device, a notification of termination of the tunnel;

delete, by the VPN server, the aggregated information regarding the domain name resolution associated with the private IP address of the user device in the VPN server subnet;

identifying, at the VPN server, the domain name resolution request as indicative of potentially unwanted traffic comprising one or more of a malicious website, a phishing website, a malware, an adware, or a third-party cookie; and sending, by the VPN server, to the user device an error message that a selected target is inaccessible, wherein the VPN server sends suggestions for the addition or removal of filtering rules together with the error message that the selected target is inaccessible.

12. The computer-readable storage medium of claim 11, wherein a session ID of the tunnel is created use a technique which enables creation of a same session ID based on a same set of input parameters.

* * * * *